US012603282B2

(12) United States Patent
Ko

(10) Patent No.: US 12,603,282 B2
(45) Date of Patent: Apr. 14, 2026

(54) CATHODE SLURRY COMPOSITION, CATHODE FOR SECONDARY BATTERY AND LITHIUM SECONDARY BATTERY

(71) Applicant: SK On Co., Ltd., Seoul (KR)

(72) Inventor: Byoung Ho Ko, Daejeon (KR)

(73) Assignee: SK On Co., Ltd., Seoul (KR)

( * ) Notice: Subject to any disclaimer, the term of this patent is extended or adjusted under 35 U.S.C. 154(b) by 54 days.

(21) Appl. No.: 18/509,427

(22) Filed: Nov. 15, 2023

(65) Prior Publication Data

US 2024/0178389 A1 May 30, 2024

(30) Foreign Application Priority Data

Nov. 29, 2022 (KR) ........................ 10-2022-0162155

(51) Int. Cl.
*H01M 4/58* (2010.01)
*H01M 4/62* (2006.01)
*H01M 10/052* (2010.01)
*H01M 4/02* (2006.01)

(52) U.S. Cl.
CPC ......... *H01M 4/5825* (2013.01); *H01M 4/622* (2013.01); *H01M 10/052* (2013.01); *H01M 2004/028* (2013.01)

(58) Field of Classification Search
CPC .. H01M 4/5825; H01M 4/622; H01M 10/052; H01M 2004/028; H01M 4/0404; H01M 4/136; H01M 4/625; H01M 4/628; H01M 2004/021; H01M 4/62; H01M 4/1397; H01M 4/624; Y02E 60/10
See application file for complete search history.

(56) References Cited

U.S. PATENT DOCUMENTS

| | | | | |
|---|---|---|---|---|
| 11,456,450 | B2 * | 9/2022 | Lim | ...................... G01N 11/162 |
| 11,735,714 | B2 * | 8/2023 | Lee | ........................ H01M 4/664 |
| | | | | 429/231.8 |
| 12,191,496 | B2 * | 1/2025 | Hellring | ................ H01M 4/623 |
| 2020/0127281 | A1 * | 4/2020 | Moon | ...................... H01M 4/13 |
| 2020/0165469 | A1 * | 5/2020 | Horikoshi | ................ C09D 7/70 |
| 2020/0176777 | A1 * | 6/2020 | Hellring | .............. H01M 4/0404 |

(Continued)

FOREIGN PATENT DOCUMENTS

| | | | | |
|---|---|---|---|---|
| KR | 1020180102390 | A | 9/2018 | |
| KR | 20180107758 | A * | 10/2018 | ......... H01M 4/5825 |

(Continued)

*Primary Examiner* — Mark Kopec
*Assistant Examiner* — Jaison P Thomas
(74) *Attorney, Agent, or Firm* — The Webb Law Firm

(57) ABSTRACT

A cathode slurry composition according to an aspect includes a cathode active material, an acrylic dispersant, and a solvent. The cathode slurry composition has a solids content of 65% by weight or more, and a shear viscosity value of 150 Pa·s or less measured at a temperature of 25° C. and a shear rate of 1/s. According to the aspect, a cathode slurry composition having excellent dispersibility, flowability, and the like, as aggregation between active cathode material particles is suppressed, and having a relatively high solids content and low shear viscosity may be provided. According to the cathode slurry composition, a cathode for a secondary battery may be formed having excellent processability without limitations on electrode loading design, coating speed setting, and the like.

11 Claims, 3 Drawing Sheets

(56) References Cited

U.S. PATENT DOCUMENTS

| | | | | |
|---|---|---|---|---|
| 2020/0259162 A1* | 8/2020 | Lee | ........................ | H01M 4/139 |
| 2020/0295347 A1 | 9/2020 | Ahn et al. | | |
| 2022/0320519 A1* | 10/2022 | Ko | ........................ | H01M 4/625 |
| 2025/0087655 A1* | 3/2025 | Zhou | ........................ | H01G 11/30 |

FOREIGN PATENT DOCUMENTS

| | | | | | |
|---|---|---|---|---|---|
| KR | 1020180107758 A | | 10/2018 | | |
| KR | 1020210041115 A | | 4/2021 | | |
| KR | 20220039040 A | * | 3/2022 | .............. | H01M 4/38 |
| KR | 1020220039040 A | | 3/2022 | | |
| WO | WO-2022080206 A1 | * | 4/2022 | ........ | C08F 220/1818 |

* cited by examiner

CATHODE SLURRY COMPOSITION, CATHODE FOR SECONDARY BATTERY AND LITHIUM SECONDARY BATTERY

CROSS-REFERENCE TO RELATED APPLICATION

This application claims priority to Korean Patent Application No. 10-2022-0162155 filed Nov. 29, 2022, the disclosure of which is hereby incorporated by reference in its entirety.

BACKGROUND OF THE INVENTION

Field of the Invention

The present disclosure relates to a cathode slurry composition, a cathode for a secondary battery, and a lithium secondary battery.

Description of Related Art

Recently, research into an electric vehicle (EV) that can replace a fossil fuel powdered vehicle, one of the main causes of air pollution, has been actively conducted. A lithium secondary battery having a high discharge voltage and output stability is mainly used as a power source of such an electric vehicle (EV), and demand and interest for a cathode for a secondary battery having excellent performance are also increasing.

A lithium-transition metal composite oxide (e.g., an NCM-based active material) or a lithium iron phosphate-based (LFP) active material containing lithium is mainly used as an active material for the cathode for a secondary battery, and a cathode slurry obtained by dissolving such a cathode active material is coated on a substrate such as a cathode current collector, or the like, and then dried to prepare a cathode for a secondary battery. In general, when a size of particles of the cathode active material is reduced, ionic conductivity may be improved, but a specific surface area is also increased, so that an aggregation phenomenon between the particles may be intensified. When the aggregation phenomenon between the particles of the active material in a slurry intensifies, dispersion of the active material may be difficult, so there may be a limitation in increasing a solids content of the slurry, and viscosity of the slurry may increase, which may decrease flowability and processability.

As such, depending on the characteristics of the cathode slurry (solids content, viscosity, and the like), there may be restrictions on cathode loading design, coating speed settings, and the like, and adhesion, resistance characteristics, and the like, of the finally formed cathode for a secondary battery may also be affected. Accordingly, there is a demand for development of a cathode slurry capable of forming a cathode for a secondary battery having improved performance with excellent processability.

SUMMARY OF THE INVENTION

An aspect of the present disclosure to provide a slurry composition capable of forming a cathode for a secondary battery without limitations in electrode loading design, coating speed setting, and the like.

Another aspect of the present disclosure to provide a cathode for a secondary battery having improved adhesion between a current collector and a cathode layer, and having a relatively low resistance value due to excellent ion conductivity and a lithium secondary battery including the same.

According to an aspect a cathode slurry composition includes: a cathode active material, an acrylic dispersant, and a solvent, wherein, in the cathode slurry composition, a solids content is 65% by weight or more, and a shear viscosity value measured at a temperature of 25° C. and a shear rate of 1/s is 150 Pa·s or less.

The acrylic dispersant may include a polyacrylate-based compound.

The acrylic dispersant may be included in the cathode slurry composition in an amount of 0.1 to 10% by weight based on a solids content.

The slurry composition may have an $R_{PA}$ value of 1.2 or less according to Equation 1 below.

$$R_{PA} = |(PA_0 - PA_1)|/PA_0 \qquad \text{[Equation 1]}$$

In Equation 1, $R_{PA}$ is a change rate of a phase angle before and after shearing of a slurry, $PA_0$ is a phase angle (°) of a slurry before shearing, and $PA_1$ is a phase angle (°) of a slurry after shearing.

The cathode active material may have an average particle diameter (D50) of less than 5 μm.

The cathode active material may include a lithium iron phosphate (LFP)-based active material.

The cathode slurry composition may further include a conductive material dispersion.

The conductive material dispersion may include an additional acrylic dispersant.

A cathode for a secondary battery according to an aspect is formed of a cathode slurry composition according to any one of the above-described embodiments.

The cathode for a secondary battery may have an electrode adhesion value of greater than 0.30 N/18 mm.

The cathode for a secondary battery may have an electrode resistance value of less than 10.0Ω·cm.

A lithium secondary battery according to an embodiment includes a cathode for a secondary battery formed of the cathode slurry composition according to any one of the above-described embodiments.

BRIEF DESCRIPTION OF THE DRAWINGS

The above and other aspects, features and other advantages of the present disclosure will be more clearly understood from the following detailed description taken in conjunction with the accompanying drawings, in which.

DESCRIPTION OF THE INVENTION

Hereinafter, various implementations according to the present disclosure will be described, but the embodiments may be modified in many different forms, and the scope thereof is not limited to the implementations described below.

In the present specification, an 'acrylic compound' refers to a compound such as a monomer or polymer having an acryl group represented by 'H₂C=CH—CO—'. Illustratively, the acrylic compound may be an 'acrylate-based' compound, which is a monomer or polymer having an acrylate group represented by 'H₂C═CH—COO—'. In this case, the 'acrylate-based' compound may be a polyacrylate-based compound such as polymethyl methacrylate (PMMA).

As described above, as a particle size of the cathode active material decreases, ion conduction characteristics may be improved, but a degree of aggregation between the particles also increases, and thus dispersibility in the slurry may decrease. In this case, viscosity of the slurry may increase and flowability may decrease, and there may be a limitation in increasing the solids content of the slurry, so it may be difficult to improve processability, cathode energy density, and the like.

Figure 1A:
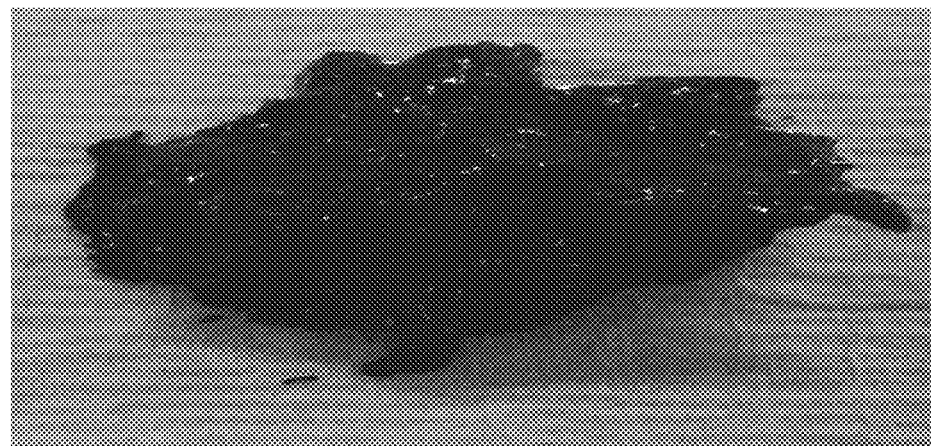
FIG. 1A is a view illustrating a form of a cathode slurry composition according to Comparative Example 2.
Figure 1B:
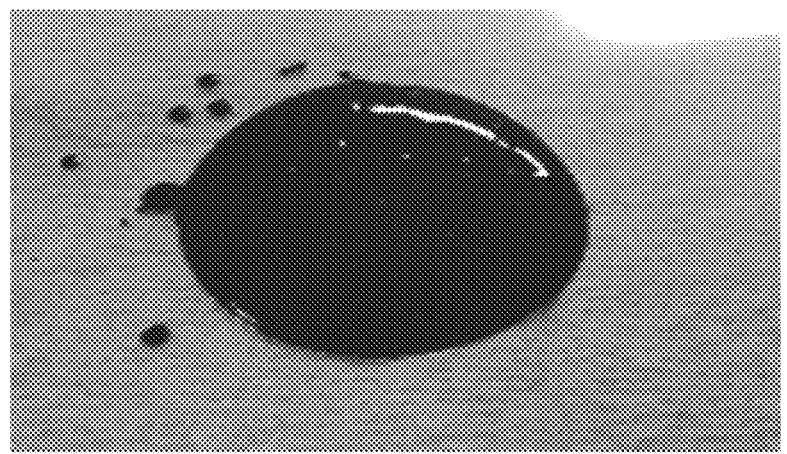
FIG. 1B is a view illustrating a form of a cathode slurry composition according to Example 5.
Figure 1C:
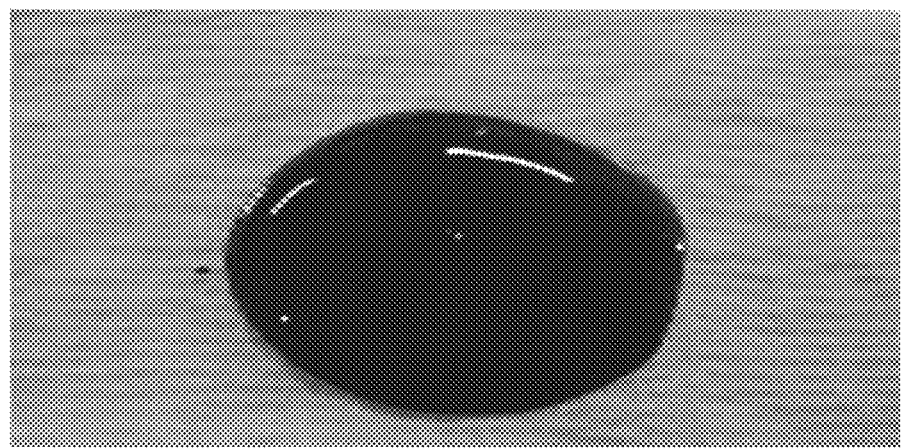
FIG. 1C is a view illustrating a form of a cathode slurry composition according to Example 6.

Accordingly, the inventors confirmed that when an acrylic dispersant is added to a cathode slurry, the degree of dispersion of the cathode active material may be effectively improved to suppress aggregation between the particles, and the viscosity of the slurry may be reduced, the solids content thereof, and the like, may be increased. With reference to FIGS. 1A to 1C, implementations thereof are described in detail below.

FIG. 1A is a view illustrating a form of a cathode slurry composition according to Comparative Example 2.

FIG. 1B is a view illustrating a form of a cathode slurry composition according to Example 5.

FIG. 1C is a view illustrating a form of a cathode slurry composition according to Example 6.

Cathode Slurry Composition

A cathode slurry composition according to an embodiment includes a cathode active material, an acrylic dispersant, and a solvent. The cathode slurry composition has a solids content of 65% by weight or more, and a shear viscosity value of 150 Pa·s or less measured at a temperature of 25° C. and a shear rate of 1/s.

The acrylic dispersant is a dispersant containing an acrylic compound having an acrylic group, and may effectively improve dispersibility of a cathode active material, specifically, a cathode active material having a relatively small particle diameter in a slurry, to effectively suppress an aggregation phenomenon between cathode active materials in the cathode slurry containing the acrylic dispersant. Accordingly, by improving viscosity and flowability of the cathode slurry and increasing a solids content, a problem such as cracks during drying a slurry may be suppressed so that coating drying processability and productivity may be improved. In addition, since the solids content of the cathode slurry can be increased, a high-loading electrode can be designed, and a cathode having improved energy density can be formed.

The acrylic dispersant may be in a form of a dispersion solution in which an acrylic compound is dissolved in a separate solvent, and the acrylic compound included in the acrylic dispersant may be a polyacrylate compound. That is, the acrylic dispersant may include a polyacrylate-based compound. The polyacrylate-based compound may be, for example, an acrylic polymer such as polymethyl methacrylate (PMMA) or polybutyl acrylate (PBA), and it is not particularly limited as long as it is a compound having an acrylate group represented by 'H₂C═CH—COO—'.

The acrylic compound may have a number average molecular weight ($M_n$) of 100,000 or less. Illustratively, the number average molecular weight ($M_n$) of the acrylic compound may be 50,000 or less or 20,000 or less. In addition, a lower limit of the number average molecular weight (Mn) of the acrylic compound is not particularly limited, but may be, for example, 1,000 or more, 5,000 or more, or 10,000 or more. When a molecular weight of the acrylic compound is within the above-described range, by adjusting the viscosity of the dispersant including the acrylic compound within an appropriate range, dispersibility may be excellently improved without impairing characteristics of other components in a cathode slurry composition.

The cathode slurry composition may include 0.1 to 10% by weight of the acrylic dispersant based on a solids content. Specifically, the acrylic dispersant may be included in an amount of 0.5% by weight or more, 1% by weight or more, or 1.5% by weight or more based on the solids content, and may be included in an amount of 7% by weight or less, 5% by weight or less, 3% by weight or less, or 2% by weight or less. When the content of the acrylic dispersant in the cathode slurry composition is excessively low, there is a substantial limit to achieving an improvement effect such as dispersibility, or the like, through addition of the acrylic dispersant, and when the content of the acrylic dispersant is excessively high, an electrode resistance value may rather increase, and a content of a cathode active material may be relatively reduced, so that it may be difficult to secure high energy density. Therefore, when the content of the acrylic dispersant in the positive electrode slurry composition is adjusted within the above range, it is possible to effectively improve dispersibility of the slurry, or the like, while securing resistance characteristics and energy density at an excellent level.

The solids content of the cathode slurry composition may be 65 wt % or more, 99 wt % or less, 90 wt % or less, or 80 wt % or less.

The cathode slurry composition may have a shear viscosity value, measured at a temperature of 25° C. and a shear rate of 0.1/s, of 900 Pa·s or less, and may be specifically, 700 Pa·s or less, 500 Pa·s or less, 300 Pa·s or less, or 100 Pa·s or less, and may be 0.1 Pa·s or more or 10 Pa·s or more. In addition, the cathode slurry composition may have a shear viscosity value of 150 Pa·s or less, measured at 25° C. and a shear rate of 1/s, and may be specifically, 140 Pa·s or less, 100 Pa·s or less, 50 Pa·s or less, 30 Pa·s or less, or 10 Pa·s or less, and may be 0.1 Pa·s or more or 1 Pa·s or more. In addition, the cathode slurry composition may have a shear viscosity value of 30 Pa·s or less, measured at a temperature of 25° C. and a shear rate of 4.64/s, and may be specifically, 20 Pa·s or less or 10 Pa·s or less, and 0.1 Pa·s s or more or 1 Pa·s or more. In addition, the cathode slurry composition may have a shear viscosity value of 3.5 Pa·s or less, measured at a temperature of 25° C. and a shear rate of 100/s, and may be specifically, 3 Pa·s or less or 2 Pa·s or less, and 0.1 Pa·s s or more or 1 Pa·s or more.

When a solids content value and a shear viscosity value of the cathode electrode slurry composition are within the above-described ranges, respectively, flowability of the slurry may be relatively excellent, so that coating/drying processibility and productivity may be effectively improved, and occurrence of a cracking phenomenon in a cathode mixture layer may be alleviated, so that a cathode for a secondary battery loaded with high density may be designed, and having improved energy density may be provided.

The cathode slurry composition may have an $R_{PA}$ value of 1.2 or less according to Equation 1 below.

$$R_{PA}=|(PA_0-PA_1)|/PA_0 \qquad \text{[Equation 1]}$$

In Equation 1, $R_{PA}$ is a phase angle change rate before and after shearing of the slurry, $PA_0$ is a phase angle (°) of the slurry before shearing, and $PA_1$ is a phase angle (°) of the slurry after shearing.

Specifically, the $R_{PA}$ value may be 1 or less, 0.5 or less, 0.4 or less, or 0.2 or less, and may be 0.02 or more or 0.1 or more. In this case, for shear conditions, a condition of applying shearing for a time of 300 seconds at a shear rate of 500/s may be applied.

The phase angle (PA) is a parameter that can evaluate viscoelastic characteristics of a slurry for electrodes, and may be calculated according to Equation 2 below.

$$\delta = \tan^{-1}(G''/G') \qquad \text{[Equation 2]}$$

In Equation 2, $\delta$ is a phase angle (°), G' is a storage modulus value measured at a temperature of 25° C., and G'' is a loss modulus value measured at a temperature of 25° C.

The storage modulus value (G'), loss modulus value (G''), phase angle, and the like may be measured and calculated by a Plate & Plate (PP) rheometer measurement method. Specifically, after a certain amount of slurry is loaded on a lower plate and an upper paste spindle is adjusted to a 0.5 mm gap, rheology may be measured at a constant temperature of 25° C. In this case, shear is applied for 300 seconds at a shear rate of 500/s to conduct an oscillation test before/after shearing, and as a result, a phase angle, G* (complex modulus), and the like may be measured and confirmed.

The storage modulus value (G') is a value representing a degree of elasticity of an object, which exhibits characteristics of an elastic body, wherein the higher the value, a degree of deformation against external force is relatively low and a characteristic of storing the same restorative force is high. On the other hand, the loss modulus value (G'') is a value representing a degree of liquidity of the object, which exhibits characteristics close to those of liquids, wherein the higher the value, the greater the degree of deformation against external force and the smaller the degree of loss (restorative force). Therefore, as the value of G'' relative to the value of G' is relatively large (i.e., as the phase angle $\delta$ is relatively large), the object may exhibit characteristics closer to that of a liquid than a solid.

In general, a slurry coating process may be performed by coating a cathode slurry stored in a storage tank under agitation on a current collector, and viscoelastic characteristics may change depending on a storage time of a slurry, so a degree of shear applied to the slurry during the coating process may be different. In this case, the greater the degree of change in the viscoelastic characteristics (phase angle) of the slurry before and after shearing, the more it may be necessary to continuously adjust fine coating conditions, and in this case, processibility, productivity, and the like, may be greatly deteriorated. Therefore, when the $R_{PA}$ value is within the above-described range, loading uniformity in the coating process may be improved and defects such as the occurrence of coating gaps by reducing a degree of non-uniformity between coated and uncoated portions may be reduced, so that processibility, productivity, and the like, of manufacturing a cathode using a cathode slurry composition may be excellent.

A phase angle ($PA_0$) before shearing of the cathode slurry composition may be 5° or more, 10° or more, 15° or more, 20° or more, or 30° or more, and may be 60° or less. In addition, a phase angle ($PA_1$) after shearing of the cathode slurry composition may be 10° or more, 15° or more, 20° or more, 25° or more, or 30° or more, and may be 70° or less. In this case, as shear conditions, a shear rate of 500/s and a time of 300 sec may be applied. When shear is applied to a slurry, a structure thereof may be deformed and viscoelastic characteristics of the slurry may vary, and when the phase angle ($PA_1$) of the slurry after shearing is within the above-described range, in a coating process in which shear is applied to the slurry according to a predetermined shear rate, the coating process may be performed smoothly due to the excellent flowability of the slurry.

The cathode active material may have an average particle diameter (D50) of less than 5 μm. Specifically, the cathode active material may have an average particle diameter (D50) of 3 μm or less or 1.5 μm or less, and may be 0.1 μm or more or 0.5 μm or more. In addition, the cathode active material may have a specific surface area (BET) of 3 $m^2$/g or more. Specifically, the cathode active material may have a specific surface area (BET) of 5 $m^2$/g or more or 9.5 $m^2$/g or more, and may be 50 $m^2$/g or less, 30 $m^2$/g or less, or 13.5 $m^2$/g or less.

The average particle diameter (D50) means an average particle diameter on a basis of 50% of the particle diameter distribution, and may be measured and calculated by a conventional particle diameter measurement device (e.g., Microtrac MT 3000) and a method. In addition, the specific surface area (BET) may be measured and calculated by a common gas adsorption method specific surface area measurement device, or the like.

As described above, in general, as a particle size of a cathode active material decreases, ion conduction characteristics may be improved, but as a specific surface area increases, aggregation between particles intensifies, so that there may be a limitation in improving a solids content of the slurry. A cathode slurry composition according to an embodiment may include an acrylic dispersant or the like, to improve dispersibility of the cathode active material having a fine particle size and a large specific surface area in the slurry, and accordingly, the ion conduction characteristics, the high solids content characteristics of the slurry, and the like, may be simultaneously improved.

Therefore, when an acrylic dispersant, or the like is included in a slurry composition containing a cathode active material having an average particle diameter (D50) adjusted within the above-described range, slurry flowability, active material manufacturing processability, and the like, may be improved while securing the ion conduction characteristics of the cathode active material to an excellent level.

A type of cathode active materials included in the cathode slurry composition is not particularly limited. Illustratively, the cathode active material may include at least one type of an LCO-based cathode active material represented by a chemical formula of $LiCoO_2$; an NCM-based cathode material represented by a formula of $Li_xNi_aCo_bMn_cO_y$ ($0<x\leq1.1$, $2\leq y\leq2.02$, $0<a<1$, $0<b<1$, $0<c<1$, $0<a+b+c\leq1$); an LTO-based cathode active material represented by a chemical formula of $Li_{14}Ti_{15}O_{12}$; or a lithium iron phosphate (LFP)-based active material represented by a chemical formula of $LiFePO_4$.

Meanwhile, in a cathode slurry composition according to an embodiment, the cathode active material may include a lithium iron phosphate (LFP)-based active material. When the cathode slurry composition includes a lithium iron phosphate (LFP)-based active material as a cathode active material, the advantages of the lithium iron phosphate (LFP)-based active material may be maximized while the disadvantages may be effectively alleviated. The lithium iron phosphate-based (LFP) active material is structurally a very stable cathode active material, and generally has a high stability compared to a nickel-chromium-manganese composite oxide (NCM)-based active material, but has relatively low ion conduction characteristics. In this regard, when a lithium iron phosphate-based (LFP) active material is applied as a cathode active material, the particle size may be reduced to improve ion conduction characteristics, but in this case, as described above, aggregation between particles in the slurry may easily occur. Therefore, when a lithium iron phosphate (LFP)-based active material is applied as a cathode active material, it is practically difficult to secure processability according to viscosity and solids content characteristics of the slurry while securing both stability and ion conduction characteristics.

Therefore, when an acrylic dispersant is included in a cathode slurry composition containing a lithium iron phosphate (LFP)-based active material, the slurry flowability, active material manufacturing processability, and the like may be effectively improved while securing both structural stability and ion conduction characteristics of the LFP-based cathode active material at an excellent level.

A type of a solvent included in the acrylic dispersant and a solvent included in the cathode slurry composition are not particularly limited, and may include one or more organic solvents, respectively. For example, the solvent may include one or more of dimethyl sulfoxide (DMSO), isopropyl alcohol, N-methyl-2-pyrrolidone (NMP), acetone, and the like. When the solvent includes the above-described organic solvent, an acrylic compound in the acrylic dispersant may be appropriately dispersed. In addition, considering a coating thickness, manufacturing yield, and the like, of a cathode slurry composition, slurry components such as a cathode active material, a conductive material, and the like, may be appropriately dissolved or dispersed, and thickness uniformity of the formed cathode mixture layer may be excellent.

The cathode slurry composition may further include a conductive material dispersion. The conductive material is used to impart conductivity to an electrode, and to maintain a structure of the electrode, and may have conductivity without causing side reactions with other elements of the secondary battery. The conductive material may include graphite such as natural graphite, artificial graphite, or the like; carbon-based materials such as carbon black, acetylene black, ketjen black, channel black, furnace black, lamp black, summer black, carbon fiber, carbon nanotube (CNT), graphene, and the like; metal powders or metal fibers such as copper, nickel, aluminum, and silver; conductive whiskers such as zinc oxide and potassium titanate; conductive metal oxides such as titanium oxide; or conductive polymers such as polyphenylene derivatives, singly or in combination of two or more thereof.

The cathode slurry composition may include a conductive material in a form of a conductive material dispersion, which is a separate solution obtained by pre-dispersing the conductive material in a dispersion medium. In general, the conductive material is added to a cathode slurry in a powder state, and a method of applying strong kneading treatment with a Planetary Disperser (PD) Mixer, or the like, in the addition step to disperse the conductive material into the cathode slurry is applied, but in this case, when a conductive material having high performance is introduced in a powder state, it is substantially difficult to disperse, and there is a problem in that a slurry preparation (mixing) process is prolonged.

In this regard, when the cathode slurry composition includes a conductive material in a form of the above-described conductive material dispersion, the dispersibility of the conductive material may be further improved, so that a solids content of the cathode slurry including the conductive material, the manufacturing processability of the cathode slurry, and the like, may be further improved, and adhesion, resistance characteristics, and the like of the finally formed cathode may be improved.

In this case, the dispersant may be a separate acrylic dispersant, different from the acrylic dispersant included in the cathode slurry described above. That is, the conductive material dispersion may include an additional acrylic dispersant. When the conductive material dispersion includes an additional acrylic dispersant, dispersibility of components such as a cathode active material, a conductive material, and the like, may be further improved together with the acrylic dispersant included in the cathode slurry described above. A detailed description of the additional acrylic dispersant and dispersion medium overlaps with those described in relation to the acrylic dispersant and solvent, respectively, and thus the description thereof will be omitted.

The conductive material dispersion may include the additional acrylic dispersant in an amount of 5 to 40 parts by weight based on a solids content, based on 100 parts by weight of the conductive material. Specifically, the conductive material dispersion may include the additional acrylic dispersant in an amount of 10 parts by weight or more or 20 parts by weight or more, and 30 parts by weight or less, based on 100 parts by weight of the conductive material.

The conductive material dispersion may include 0.1 to 10% by weight of the additional acrylic dispersant based on the solids content. Specifically, the conductive material dispersion may include the additional acrylic dispersant in an amount of 1% by weight or more or 2% by weight or more based on the solids content, and may include the additional acrylic dispersant in an amount of 7% by weight or less or 4% by weight or less.

The conductive material dispersion may include a conductive material in an amount of 0.1 to 20% by weight based on a solids content. Specifically, the conductive material dispersion may include a conductive material in an amount of 1% by weight or more, 5% by weight or more, and in an amount of 15% by weight or less based on the solids content.

A content of a conductive material included in the cathode slurry composition may be 0.01 to 10% by weight based on the solids content. Specifically, the content of the conductive material included in the cathode slurry composition may be 0.1% by weight or more or 0.3% by weight or more, and may be 5% by weight or less or 3% by weight or less based on the solids content.

A content of an additional acrylic dispersant included in the cathode slurry composition may be 0.01 to 5% by weight based on the solids content. Specifically, the content of the additional acrylic dispersant included in the cathode slurry composition may be 0.05% by weight or more or 0.1% by weight or more, and may be 3% by weight or less or 1% by weight or less based on the solids content.

When (1) the contents of the conductive material and the additional acrylic dispersant contained in the conductive material dispersion, (2) the contents of the conductive material and the additional acrylic dispersant contained in the cathode slurry composition, and the like are adjusted within the above-described range, respectively, a solids content of the slurry may be increased by improving dispersibility of the conductive material in the cathode slurry, and manufacturing processability and performance of the finally formed cathode may be further improved.

The cathode slurry composition may further include a binder. The binder is a compound added to improve attachment between particles of the cathode active material and adhesion between the cathode active material and a current collector, a type thereof is not particularly limited, and a common binder used to form a cathode for a secondary battery may be applied. Illustratively, the binder may be at least one compound selected from a group consisting of polyvinylidene fluoride (PVDF), polyvinylidene fluoride-hexafluoropropylene copolymer (PVDF-co-HFP), polyvinyl alcohol (PVA), polyacrylonitrile (PAN), carboxymethylcellulose (CMC), starch, hydroxypropylcellulose, polyvinylpyrrolidone, tetrafluoroethylene, polyethylene, polypropylene, ethylene-propylene-diene polymer (EPDM), sulfonated-EPDM, styrene butadiene rubber (SBR), and fluororubber or a copolymer thereof. When the cathode slurry composition further includes a binder, the binder may be included in an amount of 0.1 to 10% by weight based on the solids content. Specifically, the binder may be included in an amount of 0.5% by weight or more or 18 by weight or more, and may be included in an amount of 5% by weight or less or 3% by weight or less based on the solids content.

A method for forming the cathode slurry composition is not particularly limited. Illustratively, a cathode slurry composition may be formed by mixing the cathode active material, the acrylic dispersant, the solvent, and the like, with a thinky mixer, or the like. In this case, a temperature condition of the mixing process may be 20 to 60° C., a mixing (agitation) speed may be 500 to 1500 RPM, and a mixing time may be 10 to 30 min.

Cathode for Secondary Battery

A cathode for a secondary battery according to an embodiment is formed of a cathode slurry composition according to any one of the above-described embodiments. The cathode for the secondary battery includes a cathode current collector; and a cathode mixture layer formed on at least one surface of the cathode current collector. A method of manufacturing a cathode for a secondary battery using the cathode slurry composition is not particularly limited, and a conventional manufacturing method may be applied. Illustratively, a cathode for a secondary battery may be manufactured by applying the cathode slurry composition on a cathode current collector, drying and rolling the same to form a cathode mixture layer.

The cathode current collector is not particularly limited as long as it has conductivity without causing chemical changes in a secondary battery, and illustratively, as the cathode current collector, stainless steel, aluminum, nickel, titanium, calcined carbon, or aluminum or stainless steel surface treated with carbon, nickel titanium, silver, or the like, may be applied. The cathode for a secondary battery may have an electrode adhesion value of greater than 0.30 N/18 mm. Specifically, the cathode for a secondary battery may have an electrode adhesion value of greater than 0.36 N/18 mm, greater than 0.37 N/18 mm, 0.38 N/18 mm or more, or 0.4 N/18 mm or more, and may have an electrode adhesion value of 5 N/18 mm or less, and 1 N/18 mm or less. Specifically, the cathode for a secondary battery may have an electrode adhesion value of greater than 0.36 N/18 mm, greater than 0.37 N/18 mm, 0.38 N/18 mm or more, or 0.4 N/18 mm or more, and may have an electrode adhesion value of 5 N/18 mm or less, and 1 N/18 mm or less.

The cathode for a secondary battery may have an electrode resistance value of less than 10.0Ω·cm. Specifically, the cathode for the secondary battery may have an electrode resistance value of less than 7.8Ω·cm, less than 5.3Ω·cm, 5.2Ω·cm or less, or 4.5Ω·cm or less, and may have an electrode resistance value of 0.1Ω·cm or more or 1Ω·cm or more. The electrode resistance value may be measured by contacting the cathode with a 4-Point-Probe of an electrode resistance meter.

Lithium Secondary Battery

A lithium secondary battery according to an embodiment includes a cathode for a secondary battery formed of the cathode slurry composition according to any one of the above-described embodiments. That is, the lithium secondary battery may include a cathode for a secondary battery according to any one of the above-described embodiments. Illustratively, the lithium secondary battery may include a cathode for a secondary battery according to any one of the above-described embodiments; an anode for a secondary battery; a separator interposed between the cathode and the anode; and an electrolyte.

A composition and structure of the anode are not particularly limited, and a conventional anode for a secondary battery may be applied. Illustratively, the anode may include: an anode current collector; and an anode mixture layer formed on at least one surface of the anode current collector.

The anode mixture layer may include one or more types of a carbon-based active material such as artificial graphite and natural graphite, and a silicon-based active material such as Si, SiOx (0<x<2), and Si—C composite, as cathode active materials.

A material, structure, and the like, of the separator is not particularly limited, and a conventional separator for a secondary battery may be applied. Illustratively, as the separator, a porous polymer film formed of polyolefin polymers such as ethylene homopolymer, propylene homopolymer, ethylene/butene copolymer, ethylene/hexene copolymer, and ethylene/methacrylate copolymer; a conventional porous nonwoven fabric comprised of glass fibers having a high melting point; a separator coated with a ceramic component or a polymer material may be applied in a single layer or multi-layer structure.

A composition of the electrolyte is not particularly limited, and a conventional electrolyte for a secondary battery may be applied. Illustratively, the electrolyte may include one or more of an organic liquid electrolyte, an inorganic liquid electrolyte, a solid polymer electrolyte, a gel polymer electrolyte, a solid inorganic electrolyte, a molten inorganic electrolyte, and the like.

EXAMPLE

1. Slurry and Cathode Preparation

1) Cathode Slurry

A carbon nanotube (CNT) conductive material dispersion was added in a slurry containing an acrylic dispersant, an LFP-based cathode material (BTR Co., P198-S20), a PVDF-based binder (KUREHA Co., KF 9700), and a solvent (N-methyl-2-pyrrolidone; NMP) to prepare a cathode slurry. In this case, the acrylic dispersant was added in a form of a dispersion containing 30% by weight of a polyacrylate compound, by dissolving a polyacrylate-based compound having a number average molecular weight (Mn¬) of 10,000 to 20,000 in N-methyl-2-pyrrolidone (NMP). A carbon nanotube (CNT) conductive material dispersion of Comparative Examples 1 to 2 and Examples 1 to 4 was added in a form of 6% of a dispersion in which a weight ratio of carbon nanotube (CNT) including 0.5% by weight of carbon nanotube (CNT), 0.1% by weight of hydrogenated nitrile butadiene rubber (H-NBR), and a remainder of a solvent (N-methyl-2-pyrrolidone; NMP):hydrogenated nitrile butadiene rubber (H-NBR) is 5:1. Meanwhile, in Examples 5 and 6, a carbon nanotube (CNT) conductive material was added in a form of a dispersion containing an additional acrylic dispersant as shown in Table 2 below, and unlike Example 6, in the case of Example 5, a separate acrylic dispersant, other than the acrylic dispersant included in the conductive material dispersion was not further added.

Meanwhile, a content of the acrylic dispersant was calculated based on a content of acrylic polymer, which is a solid component included in a dispersion solution, and a content of the conductive material was calculated based on a content of carbon nanotubes (CNT), which is a solids content included in a pre-dispersion solution of the conductive material of the carbon nanotubes (CNT).

2) Cathode

A cathode for a secondary battery including a cathode current collector including a cathode current collector, formed by applying a cathode slurry composition of Examples and Comparative Examples formed as described above to a cathode current collector (Al-Foil) having a thickness of 12 μm at a loading weight (LW) of 23.6 mg/cm$^2$, and then drying the same at 130° C., and rolling the same to a thickness of 195 μm; and a cathode mixture layer formed on one surface of the cathode current collector, the cathode for a secondary battery (loading weight after rolling (LW): 23.1 mg/cm$^2$, electrode density: 2.525 g/cc), was formed.

2. Slurry and Cathode Evaluation

1) Cathode Slurry

A slurry composition, solids content, shear viscosity according to a shear rate, and a phase angle value before/after shearing, in Examples and Comparative Examples formed as described above, were shown in Tables 1 and 2. In this case, the shear viscosity was measured according to the shear rates shown in Tables 1 and 2 at a temperature of 25° C., respectively, and the phase angle was measured and calculated by a plate & plate (PP) rheometer measurement method under the condition of applying shear for 300 seconds at a shear rate of 500/s. Specifically, a certain amount of slurry was placed on a lower plate, an upper paste spindle was adjusted to a 0.5 mm gap, and the rheology was measured at a constant temperature of 25° C., and an oscillation test before/after shearing was performed by applying shear for 300 seconds at a shear rate of 500/s, and as a result, the phase angle was measured and confirmed.

2) Cathode

(1) Electrode Adhesion

A cathode for a secondary battery formed as described above was subjected to a 90-degree peel test by a peel tester to measure the adhesive strength between the positive electrode current collector and the positive electrode cathode layer, and the results were provided in Tables 1 and 2 below. Specifically, after cutting the cathode into a size of 18 mm in width and 150 mm in length, tape having a width of 18 mm was attached to the cathode current collector, and a roller having a load of 2 kg was used to ensure sufficient adhesion. Thereafter, the cathode mixture layer was adhered to one side surface of a tensile tester (IMADA Co., DS2-50N) using double-sided tape, and then adhesion was measured by fastening the tape attached to the cathode current collector to the other side surface of the tensile tester.

(2) Electrode Resistance Characteristics

For the cathode for a secondary battery prepared as described above, a cathode resistance value was measured by contacting a 4-Point-Probe of an electrode resistance meter (Hioki Co.), and the results thereof were provided in Tables 1 and 2 below.

TABLE 1

|  |  | Comparative Example 1 | Example 1 | Example 2 | Example 3 | Example 4 |
|---|---|---|---|---|---|---|
| Content of acrylic dispersant (weight %) |  | — | 1 | 2.5 | 4 | 5.5 |
| Content of conductive material (weight %) (CNT pre-dispersion) | Type of dispersant | 0.5 H-NBR | 0.5 H-NBR | 0.5 H-NBR | 0.5 H-NBR | 0.5 H-NBR |
|  | Content of dispersant (weight %) | 0.1 | 0.1 | 0.1 | 0.1 | 0.1 |
|  | Content ratio conductive material:dispersant | 100:20 | 100:20 | 100:20 | 100:20 | 100:20 |
| Whether acrylic dispersant is included |  | X | ○ | ○ | ○ | ○ |
| Content of active material (weight %) |  | 98.5 | 97.5 | 96 | 94.5 | 93 |
| Content of binder (weight %) |  | 1.5 | 1.5 | 1.5 | 1.5 | 1.5 |
| Solids content (weight %) |  | 63 | 70 | 70 | 70 | 70 |
| Shear viscosity (Pa · s) | 1/s | 223.1 | 136.9 | 80.2 | 32.3 | 23.9 |
|  | 100/s | 3.52 | 1.11 | 2.62 | 0.36 | 3.1 |
| Phase angle (°) | Before shearing (PA$_0$) | 10.24 | 9.48 | 27.98 | 17.37 | 12.45 |
|  | After shearing (PA$_1$) | 26.14 | 20.49 | 19.32 | 14.85 | 15.44 |
|  | Phase angle change rate before/after | 1.553 | 1.161 | 0.31 | 0.145 | 0.24 |

TABLE 1-continued

|  | Comparative Example 1 | Example 1 | Example 2 | Example 3 | Example 4 |
|---|---|---|---|---|---|
| shearing ($R_{PA}$) |  |  |  |  |  |
| Electrode adhesion (N/18 mm) | 0.37 | 0.43 | 0.45 | 0.46 | 0.49 |
| Electrode resistance (Ω · cm) | 5.3 | 4.3 | 5.2 | 8.0 | 10.5 |

TABLE 2

|  |  | Comparative Example 2 |  | Example 5 |  | Example 6 |
|---|---|---|---|---|---|---|
| Content of acrylic dispersant (weight %) |  | — |  | — |  | — |
| Content of conductive material (weight %) (CNT pre-dispersant) | Type of dispersant | 0.5 | H-NBR | 0.5 | Additional acrylic dispersant | 0.5 Additional acrylic dispersant |
| | Content of dispersant (weight %) | 0.1 |  | 0.125 |  | 0.125 |
| | Content ratio conductive material:dispersant | 100:20 |  | 100:25 |  | 100:25 |
| Whether acrylic dispersant is included | | X |  | ○ (0.125%) |  | ○ (1.5% + 0.125%) |
| Content of active material (weight %) | | 97.9 |  | 97.875 |  | 96.375 |
| Content of binder (weight %) | | 1.5 |  | 1.5 |  | 1.5 |
| Solids content (weight %) | | 65 |  | 65 |  | 65 |
| Shear viscosity (Pa · s) | 0.1/s | 958.1 |  | 749 |  | 26.91 |
| | 1/s | 176.7 |  | 59.97 |  | 6.201 |
| | 4.64/s | 37.35 |  | 13.98 |  | 3.463 |
| | 100/s | 4.123 |  | 3.244 |  | 2.602 |
| Phase angle (°) | Before shearing ($PA_0$) | 17.2 |  | 28.0 |  | 51.8 |
| | After shearing ($PA_1$) | 17.0 |  | 21.0 |  | 57.4 |
| | Phase angle change rate before/after shearing ($R_{PA}$) | 0.012 |  | 0.25 |  | 0.108 |
| Electrode adhesion (N/18 mm) | | 0.36 |  | 0.38 |  | 0.42 |
| Electrode resistance (Ω · cm) | | 7.8 |  | 6.4 |  | 4.3 |

Referring to Tables 1 and 2, in the case of a cathode slurry composition of Comparative Example 1 not including an acrylic dispersant, unlike Examples 1 to 6, it was illustrated that a shear viscosity value exceeds 150 Pa·s at a shear rate of 1/s. In addition, in the case of a cathode slurry composition of Comparative Example 2 not including an acrylic dispersant, a content of the cathode active material was relatively low compared to Comparative Example 1 so it was determined that there is a limit to securing energy density, and it was illustrated that the shear viscosity values exceeds 150 Pa·s at a shear rate of 1/s. In particular, referring to FIGS. 1A to 1C, in the case of the cathode slurry composition of Comparative Example 2 not including an acrylic dispersant, it was illustrated that, even though a solids content thereof is the same as that of Examples 5 to 6, it has a form of a slurry having relatively low fluidity, but in the case of Examples 5 to 6, particularly, in Example 6, even though it had the same solids content, it was illustrated that it has a form of a slurry having greatly improved fluidity.

In addition, it was illustrated that a cathode formed of the cathode slurry composition of Comparative Examples 1 to 2 had a relatively low electrode adhesion value, and relatively high electrode resistance value, so that the electrode adhesion and resistance characteristics were inferior.

On the other hand, it was illustrated that all of the cathode slurry compositions of Examples 1 to 6 including an acrylic dispersant had a solids content of 65% by weight or more and a shear viscosity value of 150 Pa·s or less at a shear rate of 1/s, and had a solids content of 65% by weight or more, had high solids content characteristics, and had excellent flowability and coating processability.

Meanwhile, in the case of Examples 3 and 4, in which a content of an acrylic dispersant was relatively high among the cathodes formed of the cathode slurry compositions of Examples 1 to 6, it was illustrated that an electrode adhesion value was relatively high, but an electrode resistance value was relatively high. On the other hand, in the case of Examples 1 to 2 and 5 to 6 in which the content of the acrylic dispersant was appropriately adjusted, both electrode adhesive strength and electrode resistance characteristics were seen to be excellent.

In addition, in the case of the cathode slurry composition of Example 6 including a conductive material dispersion to which an additional acrylic dispersant was applied as a cathode slurry composition containing an acrylic dispersant, it was seen that a phase angle value before and after shearing was relatively high, a phase angle change rate before and after shearing was relatively high, so that flowability, coating processability, and the like were relatively low, and electrode adhesion and electrode resistance characteristics of the formed cathode were also excellent. Therefore, as in Example 6, when a conductive material is added to the cathode slurry containing an acrylic dispersant in a form of a dispersant, and the conductive material dispersion includes an additional acrylic dispersant as a dispersant, it is believed that a cathode slurry composition having excellent flowability, coating processability, and excellent electrode adhesion and resistance characteristics of the finally formed cathode for a secondary battery may be provided.

As set forth above, according to an aspect, it is possible to provide a cathode slurry composition having excellent dispersibility, flowability, and the like, by suppressing aggregation between particles of a cathode active material, and having a relatively high solids content and low shear viscosity. According to the cathode slurry composition, a cathode for a secondary battery may be formed with excellent processability without limitations on electrode loading design, coating speed setting, and the like.

According to another aspect, it is possible to provide a cathode for a secondary battery capable of effectively suppressing occurrence of a peeling phenomenon of a cathode layer during charging and discharging the battery, by improving adhesion between a current collector and the cathode layer, and having excellent ion conduction characteristics, resistance characteristics, and the like, and a lithium secondary battery including the same.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A cathode slurry composition comprising:

a cathode active material, an acrylic dispersant, and a solvent, wherein the acrylic dispersant has a number average molecular weight (Mn) of 10,000 to 50,000, wherein, in the cathode slurry composition, a solids content is 65% by weight or more, a shear viscosity value measured at a temperature of 25° C. and a shear rate of 1/s is 150 Pa·s or less, and wherein an $R_{PA}$ value according to Equation 1 below is 1.2 or less, $$R_{PA} = |(PA_0 - PA_1)|/PA_0 \qquad \text{[Equation 1]}$$

in Equation 1, $R_{PA}$ is a change rate in a phase angle before and after shearing of a slurry, $PA_0$ is a phase angle (°) of a slurry before shearing, and $PA_1$ is a phase angle (°) of a slurry after shearing.

2. The cathode slurry composition of claim 1, wherein the acrylic dispersant comprises a polyacrylate-based compound.

3. The cathode slurry composition of claim 1, wherein the acrylic dispersant is included in an amount of 0.1 to 10% by weight based on a solids content.

4. The cathode slurry composition of claim 1, wherein the cathode active material has an average particle diameter (D50) of less than 5 μm.

5. The cathode slurry composition of claim 1, wherein the cathode active material comprises a lithium iron phosphate-based (LFP) active material.

6. The cathode slurry composition of claim 1, further comprising:

a conductive material dispersion.

7. The cathode slurry composition of claim 6, wherein the conductive material dispersion comprises an additional acrylic dispersant.

8. A cathode for a secondary battery, wherein the cathode slurry for a secondary battery is formed of the cathode slurry composition according to claim 1.

9. The cathode for a secondary battery of claim 8, wherein an electrode adhesion value is greater than 0.30 N/18 mm.

10. The cathode for a secondary battery of claim 8, wherein an electrode resistance value is less than 10.0Ω·cm.

11. A lithium secondary battery, comprising:

the cathode for a secondary battery according to claim 8.

* * * * *